US012182206B2

(12) United States Patent
Wu et al.

(10) Patent No.: US 12,182,206 B2
(45) Date of Patent: Dec. 31, 2024

(54) USER CONTEXT-BASED ENTERPRISE SEARCH WITH MULTI-MODAL INTERACTION

(71) Applicant: Microsoft Technology Licensing, LLC, Redmond, WA (US)

(72) Inventors: Ming Wu, Kirkland, WA (US); Yue Ma, Issaquah, WA (US); Yong Ni, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 17/385,802

(22) Filed: Jul. 26, 2021

(65) Prior Publication Data

US 2023/0027628 A1    Jan. 26, 2023

(51) Int. Cl.
*G06F 16/903* (2019.01)
*G06F 16/9032* (2019.01)
*G06F 16/9038* (2019.01)

(52) U.S. Cl.
CPC .. *G06F 16/90335* (2019.01); *G06F 16/90332* (2019.01); *G06F 16/9038* (2019.01)

(58) Field of Classification Search
CPC .......... G06F 16/3329; G06F 16/90332; G06F 16/90335; G06F 16/9038
See application file for complete search history.

(56) References Cited

U.S. PATENT DOCUMENTS

| 2008/0172390 | A1* | 7/2008 | Zeller | G06F 16/93 |
| | | | | 707/999.009 |
| 2018/0052842 | A1* | 2/2018 | Hewavitharana | G06F 40/30 |
| 2020/0364069 | A1 | 11/2020 | Liu et al. | |
| 2021/0073293 | A1 | 3/2021 | Fenton et al. | |

(Continued)

FOREIGN PATENT DOCUMENTS

WO    2021077043 A1    4/2021

OTHER PUBLICATIONS

"International Search Report and Written Opinion Issued in PCT Patent Application No. PCT/US22/031860", Mailed Date: Sep. 13, 2022, 11 Pages.

(Continued)

*Primary Examiner* — Taelor Kim
(74) *Attorney, Agent, or Firm* — Shook, Hardy & Bacon L.L.P.

(57) ABSTRACT

Examples of the present disclosure describe systems and methods for enterprise search that leverage periodically updated user context of an enterprise user for intent understanding and treat a search session as a dialog between the user and a digital assistant to allow multi-modal interaction. For example, a query input by the user may be received from a client application having search functionality and an integrated assistant. A current state of the user context may be leveraged to understand the query. Based on the understanding, one or more responsive entities may be retrieved from an enterprise search index as results. Based on the results, a response may be generated that includes the results (Continued)

and a prompt to cause the user to further refine the query and/or provide feedback. The response may be provided to the client application for output as part of a search session dialog between the user and assistant.

20 Claims, 9 Drawing Sheets

(56) References Cited

U.S. PATENT DOCUMENTS

2021/0117214 A1* 4/2021 Presant .................. H04L 67/535

OTHER PUBLICATIONS

Budzianowski, et al., "MultiWOZ—A Large-Scale Multi-Domain Wizard of-Oz Dataset for Task-Oriented Dialogue Modelling", In the Repository of arXiv:1810.00278v1, Sep. 29, 2018, 14 Pages.

Gao, et al., "Dialog State Tracking: A Neural Reading Comprehension Approach", In Proceedings of the Special Interest Group on Discourse and Dialogue, Sep. 11, 2019, pp. 264-273.

Hosseini-Asl, et al., "A Simple Language Model for Task-Oriented Dialogue,", In the Repository of arXiv:2005.00796v1, May 2, 2020, pp. 1-14.

Khan, et al., "Major Services and Features in Microsoft Graph", Retrieved from: https://docs.microsoft.com/en-us/graph/overview-major-services, Apr. 28, 2021, 9 Pages.

Lee, Hung-Yi, "Dialogue State Tracking as Question Answering", Retrieved from: http://speech.ee.ntu.edu.tw/~tlkagk/courses/DLHLP20/DSTQA%20(v6).pdf, 2020, 27 Pages.

Rastogi, et al., "Towards Scalable Multi-domain Conversational Agents: The Schema-Guided Dialogue Dataset", In Proceedings of the AAAI Conference on Artificial Intelligence, vol. 34, Issue 5, Apr. 3, 2020, pp. 8689-8696.

See, et al., "Get To The Point: Summarization with Pointer-Generator Networks", In the Repository of arXiv:1704.04368v1, Apr. 14, 2017, 19 Pages.

Sullivan, Danny, "Google's Impressive "Conversational Search" Goes Live On Chrome", Retrieved from: https://searchengineland.com/googles-impressive-conversational-search-goes-live-on-chrome-160445, May 22, 2013, 18 Pages.

Wu, et al., "Transferable Multi-Domain State Generator for Task-Oriented Dialogue Systems", In the Repository of arXiv:1905.08743v1, May 21, 2019, 12 Pages.

Zhou, et al., "Multi-domain Dialogue State Tracking as Dynamic Knowledge Graph Enhanced Question Answering", In Proceedings of NeurIPS Workshop, Nov. 2019, pp. 1-18.

* cited by examiner

USER CONTEXT-BASED ENTERPRISE SEARCH WITH MULTI-MODAL INTERACTION

BACKGROUND

For consumer or web search, two different users may enter a same query, such as "What is the closest planet to Earth" and a same result is expected to be returned to the users. In contrast, for enterprise search, which makes content from multiple enterprise-type data sources searchable to defined enterprise users, the search experience is more personalized. For example, enterprise search systems index data specific to enterprise users, such as files, communications, and contacts for that user, from various enterprise sources. Therefore, when two different enterprise users enter a same enterprise search query, such as "Find the last email I sent to my manager," different results specific to each enterprise user are expected given the different communications and contacts associated with each enterprise user. Even for a same enterprise user, intents of the user may change over time as data and interests change, and thus different results may be expected for a same query submitted at different periods in time or in association with different search sessions.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for enterprise search that leverage periodically updated user context of an enterprise user for query intent understanding to tailor or personalize query results to the enterprise user. Additionally, the enterprise search may treat a search session as a dialog between the user and a digital assistant to allow multi-modal interaction. The multi-modal interaction may encourage user interactions with the results, including provision of feedback, which may be used among other data to periodically update the user context of the enterprise user.

In aspects, an enterprise query input by the user may be received from a client application having search functionality and an integrated digital assistant. A current state of the user context may be leveraged to understand the query. Based on the understanding of the query including the determined intent and slots, one or more responsive or corresponding entities may be retrieved from an enterprise search index as results. A response may be generated that includes the results and a prompt to cause the user to further refine the query and/or provide feedback based on the results. The response may then be provided to the client application for output as part of a search session dialog between the enterprise user and digital assistant. Multi-modal interactions, including voice, touch, and text may be enabled to facilitate the search session dialog and allow the enterprise user to easily refine the query and/or provide feedback as prompted by the response. Such interactions may be captured and utilized among other data to periodically update the user context for the enterprise user. Additionally, in some examples, the search session may be a multi-turn search session, where in addition to user context, search session context may be gleaned from a previous turn and applied or carried over to a subsequent turn to facilitate query intent understanding.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
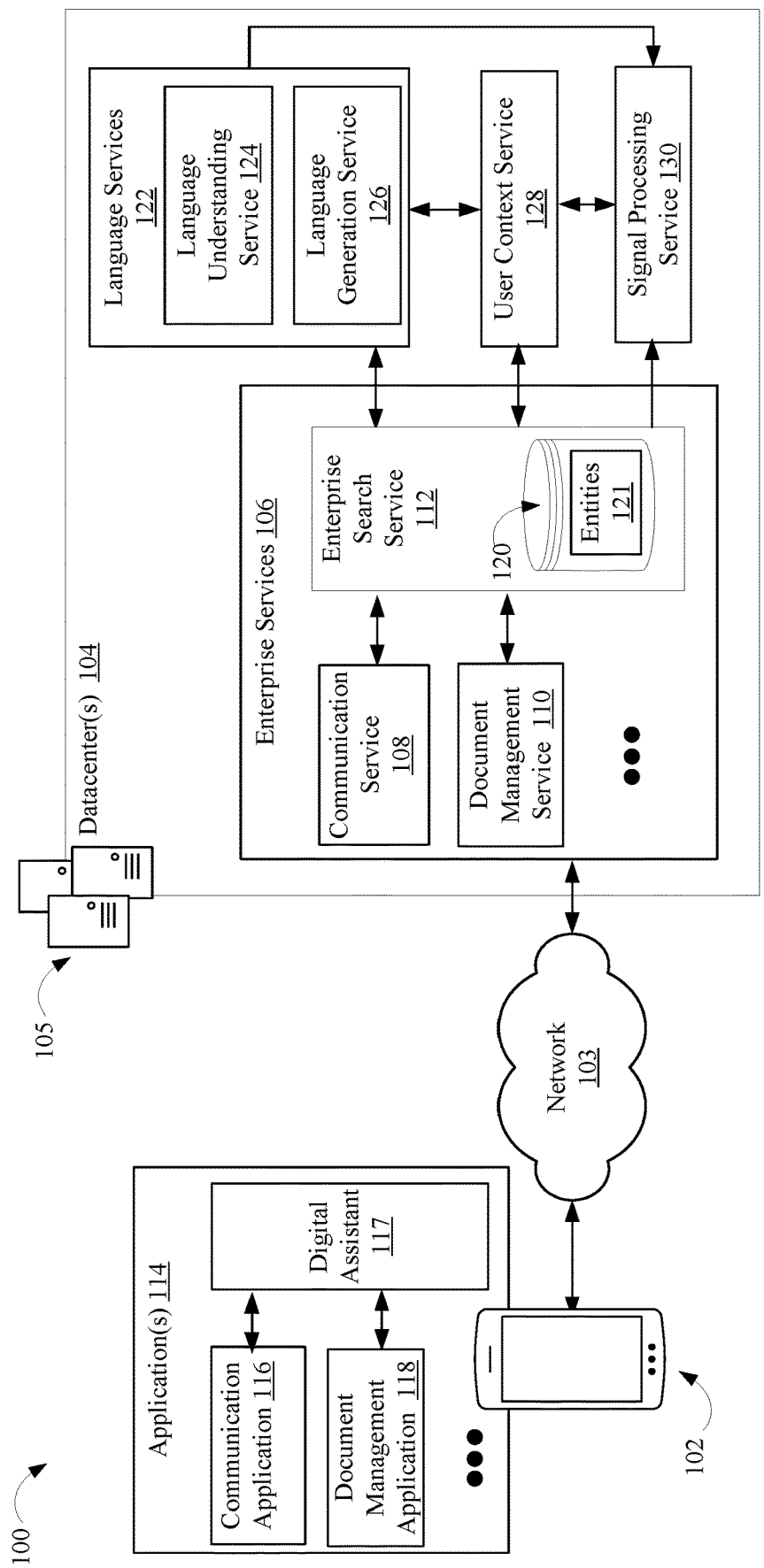
FIG. 1 illustrates an overview of an example system for enterprise search.

As briefly discussed above, user context-based enterprise search that treats a search session as a dialog to facilitate multi-modal interactions as part of the search experience is described herein. In aspects, an enterprise search query input by an enterprise user may be received from a client application having search functionality and an integrated digital assistant. A current state of the enterprise user's user context may be leveraged to understand the query, where the current state may be based on a plurality of different context types, including contexts determined from enterprise search history, query intent logs, user action history, and digital assistant history, among others, and intent-based user centric signals inferred from those contexts. As part of the understanding, one or more intents and slots of the query may be determined. Some slots may be explicitly expressed search constraints extracted from the query. Additional slots may be determined based on the current state of the user context to add additional search constraints to improve the relevancy of the results.

Based on the understanding of the query, including the determined intents and slots, one or more responsive or corresponding entities, such as files, electronic communications, contacts, meetings, or other similar content items, may be retrieved from an enterprise search index as results. Based on the results, a response may be generated that includes the results and a prompt to cause the user to further refine the query and/or provide feedback. The response may then be provided to the client application for output as part of a search session dialog between the enterprise user and digital assistant. Multi-modal interactions, including voice, touch, and text may be enabled to facilitate the search session dialog and allow the enterprise user to easily refine the query and/or provide feedback as prompted by the response. Such interactions may be captured and utilized among other data to periodically update the user context for the enterprise user. Additionally, in some examples, the search session may be a multi-turn search session, where in addition to user context, search session context may be gleaned from a previous turn and applied or carried over to a subsequent turn to facilitate query intent understanding.

Accordingly, the present disclosure provides a plurality of technical benefits including, but not limited to, more efficient, resource conserving enterprise search by leveraging user context to obtain results intended by a user and improved interfaces for enterprise search sessions that treat the search session as a dialog or a conversation to facilitate multi-modal interactions. Multi-modal interactions, including voice, may be particularly beneficial to users when utilizing devices with small display screens, such as smart phones. Increased interactions from the user, including provision of feedback or further refinement of queries, prompted by treating the search session as a dialog may be used as part of the data to update user context, which may overall improve query intent understanding and thus accuracy of results provided to the enterprise user. For example, user context may be used to add additional constraints to the query that are not explicitly expressed to more quickly narrow down the results to one that is intended by the user. This heightened accuracy reduces a number of query iterations the enterprise user may have to go through to get the results intended, and thus conserves processing resources. Additionally, when the search session is a multi-turn search session, the search session context applied may further conserve processing resources by learning from the user's previous interactions in previous turns to eliminate entities from results of future queries that are known to not be of interest to the user.

Figure 9:
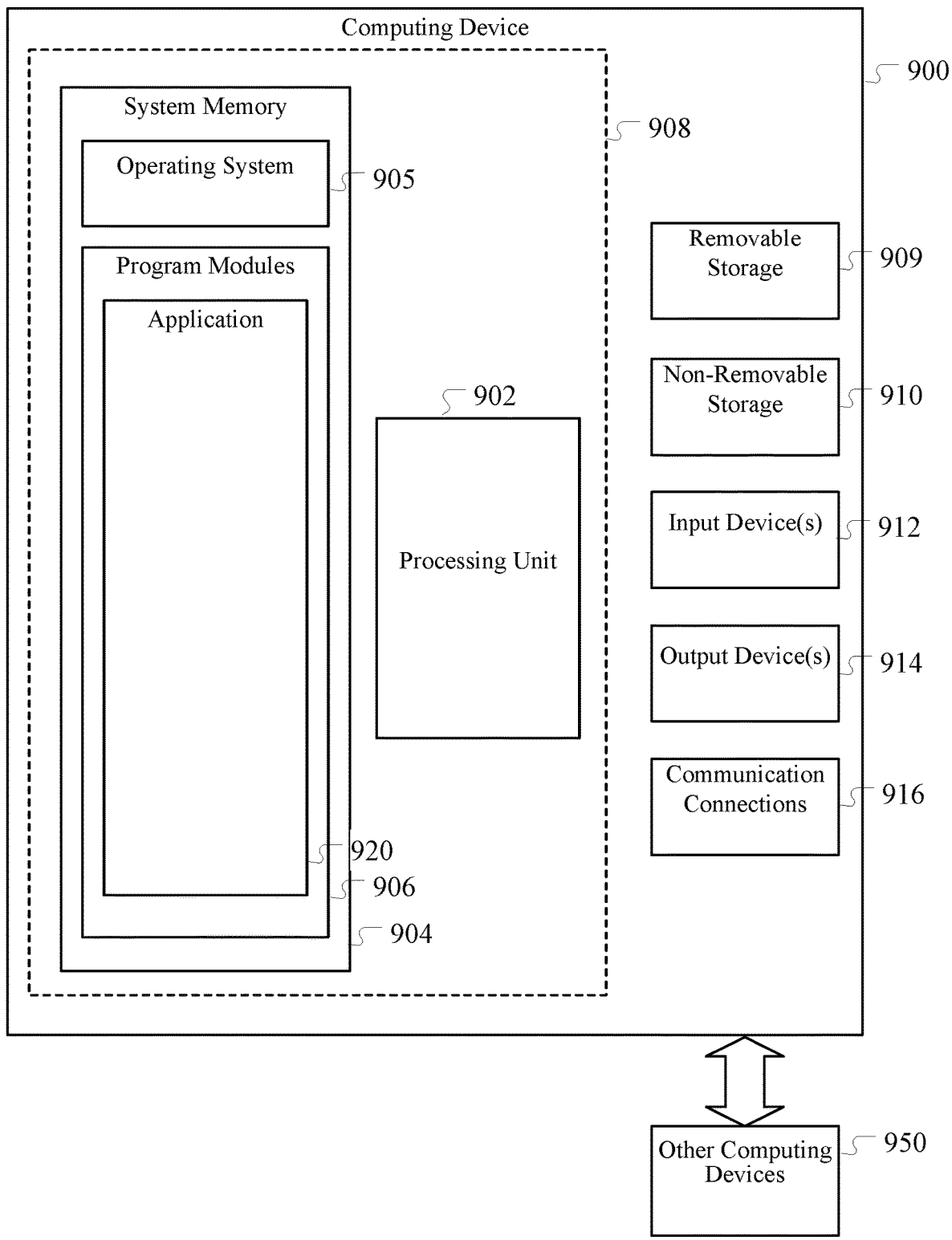
FIG. 9 is a block diagram illustrating example physical components of a computing device with which aspects of the disclosure may be practiced.

FIG. 1 illustrates an overview of an example system 100 for performing enterprise search. Example system 100 as presented is a combination of interdependent components that interact to form an integrated whole. Components of the system 100 may be hardware components or software components implemented on and/or executed by hardware components of the system 100. In some examples, the components of the system 100 disclosed herein may be distributed across multiple devices. For instance, applications running on client computing devices may be utilized to perform enterprise searches by accessing other devices in a network, such as one or more remote cloud or web server devices, that process, route, and store the respective information. FIG. 9 provides example processing devices of the system 100 such as the client computing devices and the remote cloud or web server devices.

In FIG. 1, system 100 comprises a client computing device 102, a network 103, and one or more datacenter(s) 104 comprising a plurality of cloud-based services, each made available by (e.g., hosted by) one or more of a plurality of servers 105 of the datacenter(s) 104. The cloud-based services may include enterprise services 106 including at least a communication service 108, a document management service 110, and an enterprise search service 112. The cloud-based services may also include language services 122, such as a language understanding service 124 and a language generation service 126, a user context service 128, and a signal processing service 130 that may be leveraged by the enterprise search service 112 to perform enterprise search. In some examples, the services may be associated with and capable of interacting with one another. For example, the services may be provided by a same service provider or affiliated service providers to enable varying levels of integration such that actions or commands performed by one service may cause particular actions or commands to be performed by another service.

In some aspects, the datacenter(s) 104 may include multiple computing devices, such as the servers 105, that operate a plurality virtual machines. A virtual machine may be an isolated software container that has an operating system and an application, similar to the device described below in FIG. 9. In some examples, each of the hosted services may be a separate logical entity operated or executed independently of one another (e.g., executed by a separate virtual machine in a same or different datacenter). In other examples, one or more of these services may be operated or executed by a same virtual machine. In further examples, one or more of these services may be operated or executed by other components (e.g., by one or more servers in a distributed environment). One of skill in the art will appreciate that the scale of systems such as system 100 may vary and may include additional or fewer components than those described in FIG. 1.

Examples of the client computing device 102, include, but are not limited to, personal computers (PCs), server devices, mobile devices (e.g., smartphones, tablets, laptops, personal digital assistants (PDAs)), and wearable devices (e.g., smart watches, smart eyewear, fitness trackers, smart clothing, body-mounted devices). The client computing device 102 may be a device of an enterprise user, and thus may be capable of accessing the enterprise services 106 over a network, such as network 103, through one or more applications 114 executable by the client computing device 102 that are associated with the respective enterprise services 106.

For example, the applications 114 may include a communication application 116 to access the communication service 108 over the network 103 for sending and receiving electronic communications, as well as scheduling meetings among other calendaring functions. The electronic communications may include electronic mail ("e-mail"), instant messages, SMS messages, and other similar electronic communications. Example communication services 108 include OUTLOOK and MICROSOFT TEAMS from the Microsoft Corporation of Redmond, Washington. The applications 114 may also include a document management application 118 to access the document management service 110 over the network 103 to manage and store content. An example document management service 110 includes SHAREPOINT from the Microsoft Corporation of Redmond, Washington.

In some aspects, each of the applications 114 may include search functionality or tools that allow enterprise users to submit enterprise search queries via the applications 114. Additionally, each of the applications 114 may include an integrated digital assistant 117 that enables enterprise search sessions conducted via the search functionalities of the applications 114 to be treated as a dialog between the digital assistant 117 and the enterprise user. The digital assistant may be any service that implements conversational science approaches using human-machine interfaces. An example digital assistant 117 includes CORTANA from the Microsoft Corporation of Redmond, Washington In some examples, the client computing device 102 may execute a thin version of the applications 114 (e.g., a web application running via a web browser) or a thick version of the applications 114 (e.g., a locally installed application) on the client computing device 102. Examples of the network 103 over which the client computing devices 102 access the plurality of services include, but are not limited to, personal area networks (PANs), local area networks (LANs), metropolitan area networks (MANs), and wide area networks (WANs).

The enterprise search service 112 makes content from various enterprise sources, such as the communication service 108 and the document management service 110, among other data sources, searchable for enterprise users. As one example, the enterprise may be an organization, such as a business or company, and the enterprise users may include employees of the organization. To enable efficient search, the enterprise search service 112 may store data specific to each enterprise user in a database within an enterprise search index 120, referred to hereinafter as index 120. For example, the database may include entities 121 specific to that enterprise user, such as files, electronic communications, contacts, calendars, meetings and other similar content items.

The other enterprise services 106, such as the communication service 108 and the document management service 110, may be communicatively coupled to the enterprise search service 112 such that enterprise search queries input by an enterprise user via the search functionalities or tools of the applications 114 associated with the other enterprise services 106 can be received at the enterprise search service 112 for execution. When executing enterprise search queries, the enterprise search service 112 may work in conjunction with the language services 122 to understand and generate a response to the enterprise search queries. For example, and as described in more detail with reference to FIGS. 2 and 3, the language understanding service 124 may be utilized to understand an enterprise search query, including to determine one or more intents and slots of the enterprise search query, which may be utilized by the enterprise search service 112 to retrieve responsive entities 121 from the index 120 as results to the query. The language generation service 126 may then generate responses to the enterprise search queries based on the results that can be provided back to the application 114 for output to the enterprise user as part of the search session dialog with the digital assistant 117. The response may include both the results and a prompt to cause the enterprise user to refine the query further and/or provide feedback, which facilitates the dialog to encourage multi-modal interaction. A type of the prompt may be based on the results.

Additionally, the enterprise search service 112 and at least the language understanding service 124 may leverage a user context for the enterprise user that is periodically updated by the user context service 128 to increase the relevancy of the results provided. In some examples, the user context is periodically updated based on data received and processed by the signal processing service 130. The data may include data associated with past queries received, including the intents and slots detected, the results retrieved, the responses generated, and any user interactions, including both explicit and implicit feedback, associated with the response. The user context can also be based on other types of data, described in greater detail with reference to FIG. 4. At least intent-based user centric signals may then be inferred from the user context, and these signals may be used by the enterprise search service 112 and/or the language understanding service 124 as part of the enterprise search process. Further, in some examples, the search session may be a multi-turn search session, where in addition to user context, search session context may be gleaned from a previous turn and applied or carried over to a subsequent turn to facilitate query intent understanding.

While the specific examples provided in this disclosure describe the leveraging of user context and treatment of search sessions as dialog within an enterprise search context, it is not so limited. For example, the same or similar techniques and processes may be applied in a consumer or web-based search context to improve accuracy or relevancy of results provided to users.

Figure 6:
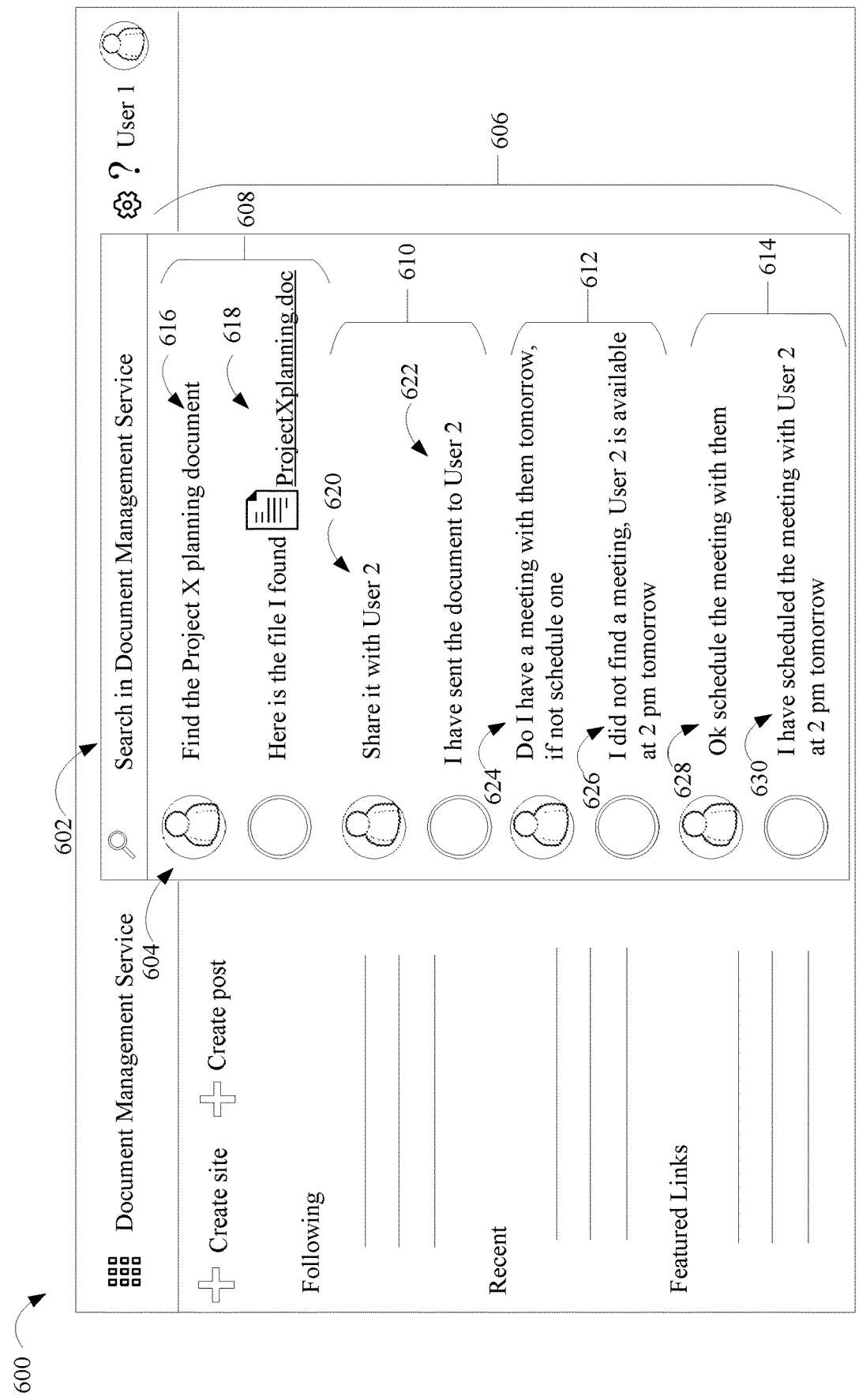
FIG. 6 illustrates an example user interface of a client application providing user context-based enterprise search capability with multi-modal interactions.
Figure 7:
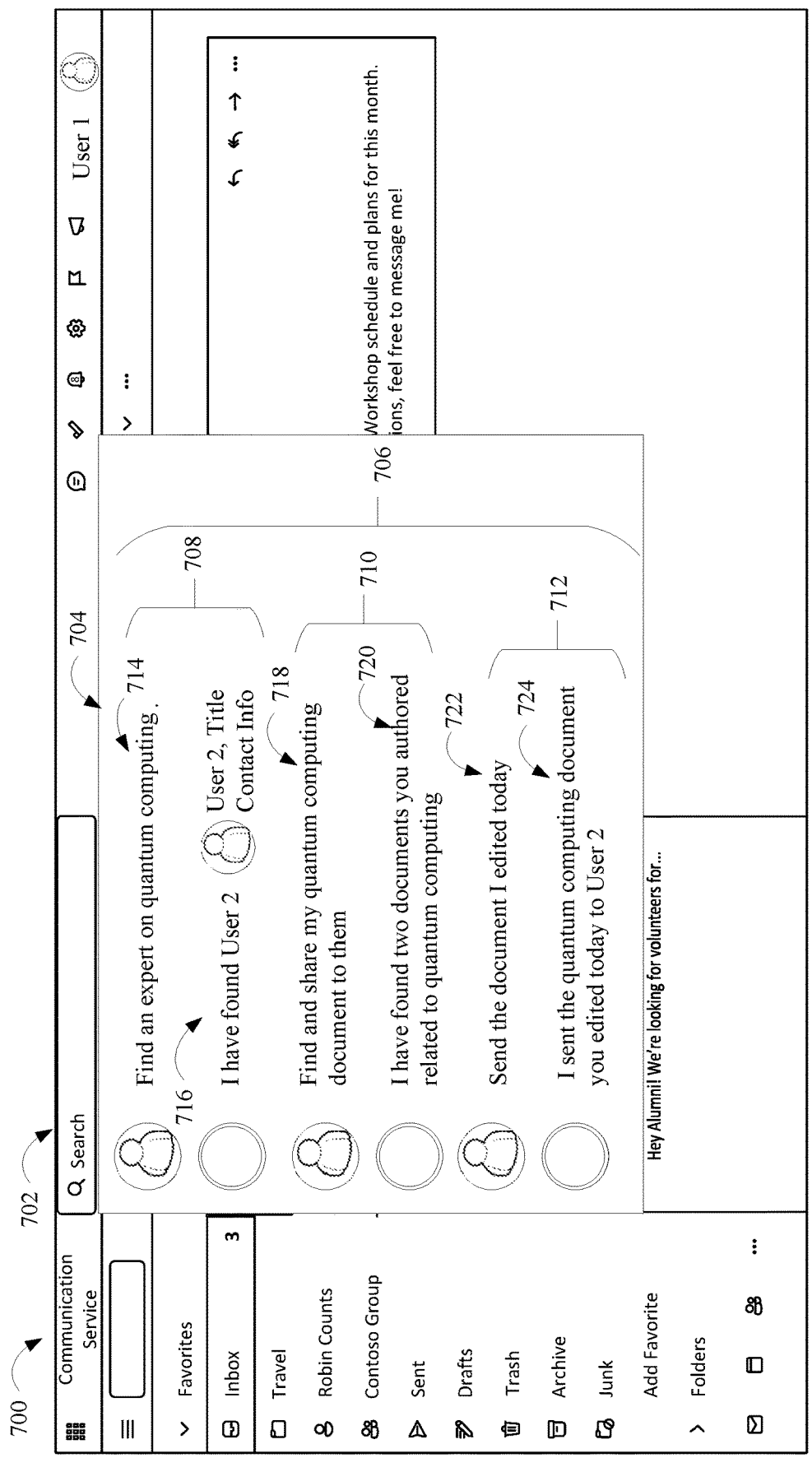
FIG. 7 illustrates another example user interface of a client application providing user context-based enterprise search capability with multi-modal interactions.
Figure 8:
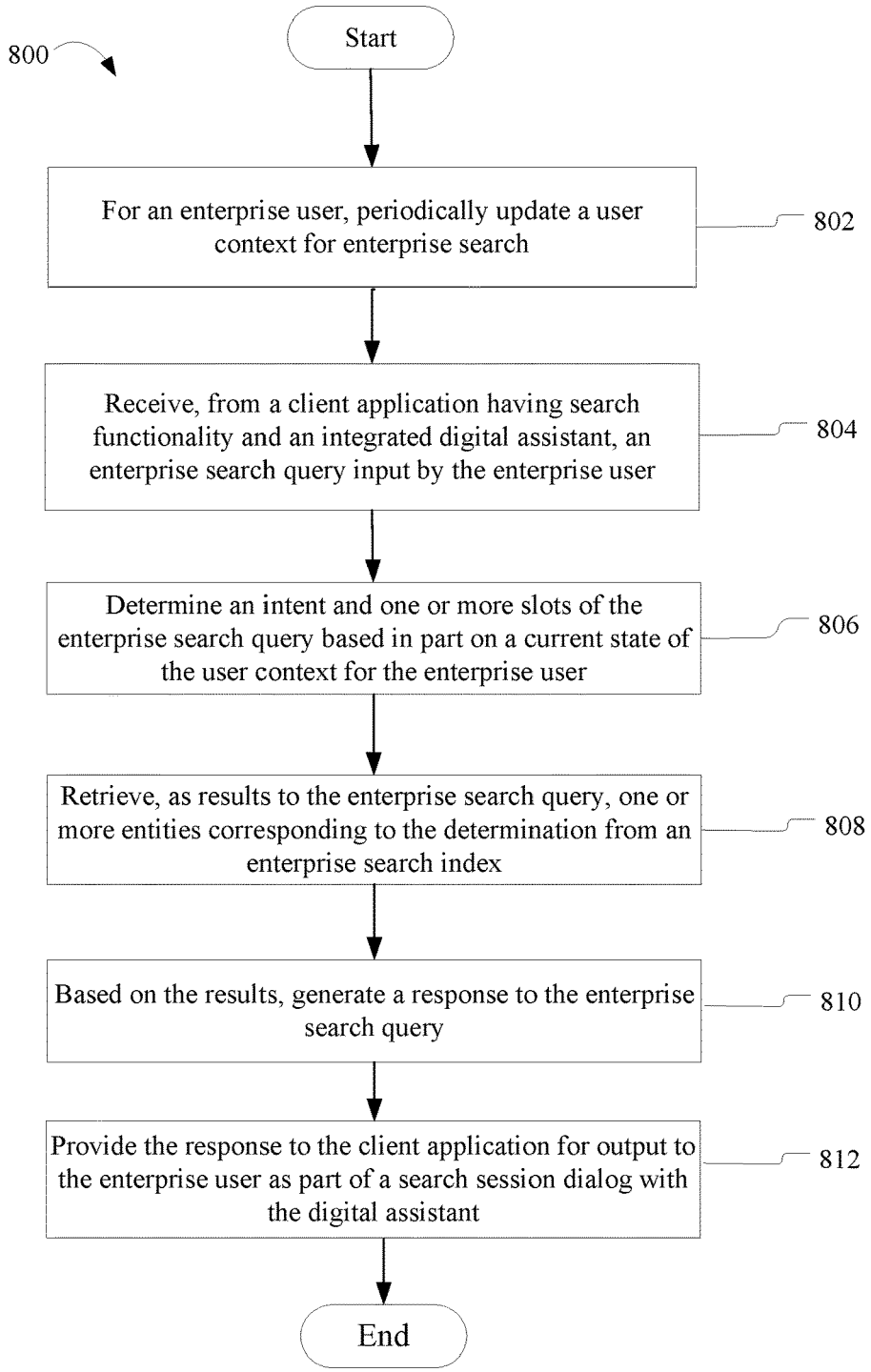
FIG. 8 illustrates an example method for performing an enterprise search.

Having described an example system that may be employed by the aspects disclosed herein, this disclosure will now describe the various services of the system, process flows for enterprise search, and example user interfaces to illustrate the search session dialog in FIGS. 2 through 7, as well as a method in FIG. 8 that may be performed by various aspects of the disclosure. In aspects, method 800 of FIG. 8 may be performed by a system comprised of one or more components of a distributed network such as system 100 of FIG. 1. However, method 800 is not limited to such examples.

Figure 2:
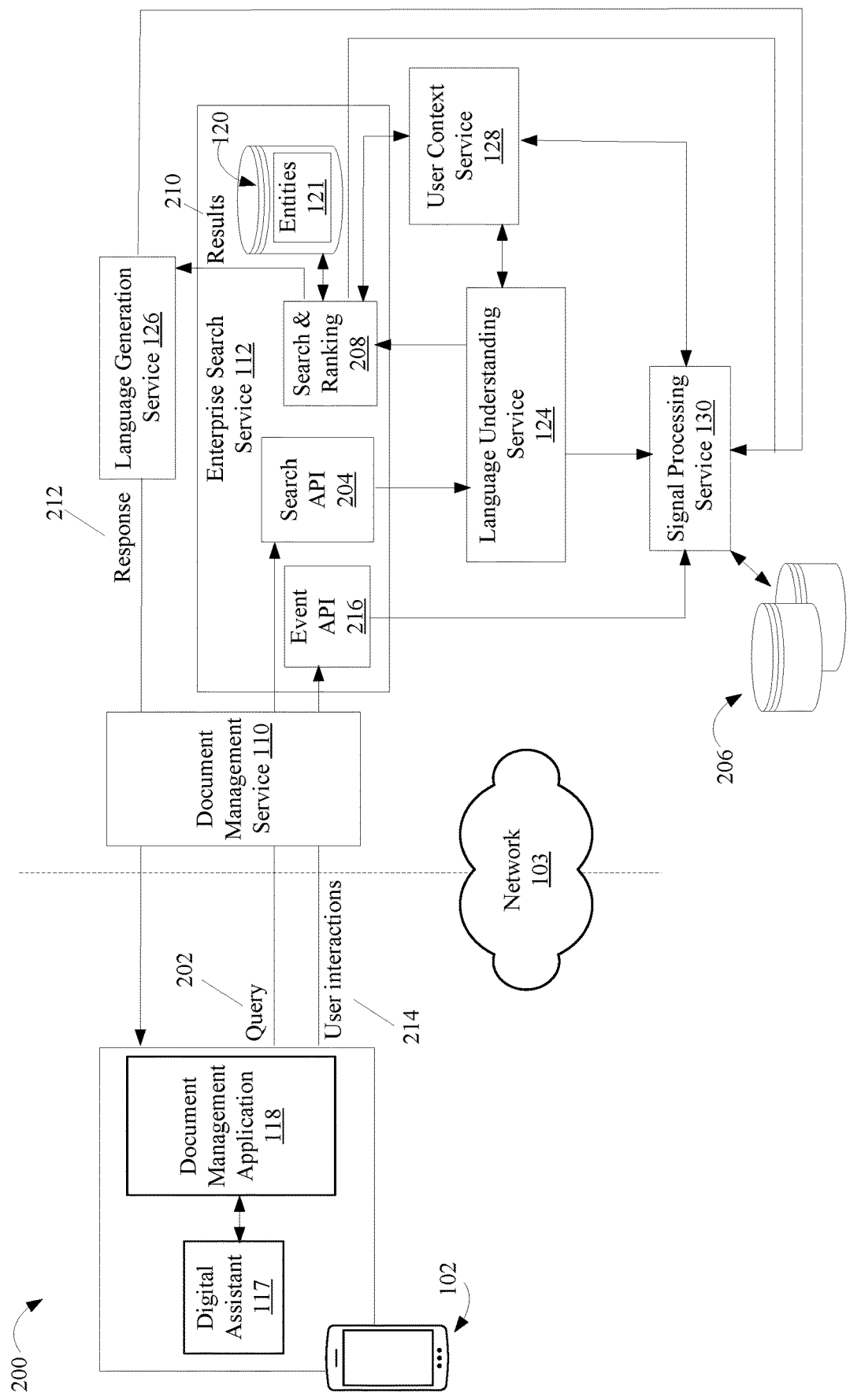
FIG. 2 illustrates an example process flow diagram for performing enterprise search.

FIG. 2 illustrates an example process flow diagram 200 for enterprise search. An enterprise user may be executing the document management application 118 having search functionality and an integrated digital assistant 117 on the client computing device 102 to access the document management service 110 over the network 103. Using the search functionality of the document management application 118, the enterprise user may submit an enterprise search query 202, hereinafter query 202. In some examples, the query 202 may be provided as a voice input or a touch input through a voice or touch user interface, respectively, of the client computing device 102. Alternatively, an input device, such as a keyboard, may be utilized to provide the query 202 as text input. As one illustrative example, the query 202 submitted may be a voice input of "Find a file shared from my manager this week". Receipt of the query 202 may initiate a search session dialog between the enterprise user and the digital assistant 117. As illustrated in FIGS. 6 and 7, in some examples, the search session dialog may be visually presented in a conversation panel displayed on a user interface of the document management application 118.

The enterprise search service 112 may include a search application programming interface (API) 204. The search API may be an interface via which the enterprise search service 112 is communicatively coupled to the other enterprise services 106 to enable enterprise search queries input via applications 114 associated with those other enterprise services 106, such as the document management application 118 executed on the client computing device 102 to access document management service 110, to be directly transmitted to the enterprise search service 112. Therefore, upon receipt of the query 202 at the document management application 118, the query 202 may be transmitted to the search API 204 of the enterprise search service 112.

The search API 204 may pass the query 202 to the language understanding service 124. As described in more detail with respect to FIG. 3, the language understanding service 124 may detect one or more intents and slots of the query 202 based in part on a current state of user context for the enterprise user retrieved from the user context service 128. In some examples, one or more explicit slots may be extracted from the query 202 (e.g., based on language in the query 202). Using the user context, the language understanding service 124 may further detect one or more additional slots that serve as additional constraints to the query 202. Adding additional constraints based on the user context may improve relevancy of results provided. Continuing the illustrative example above, for the query "Find a file shared from my manager this week," the detected intent may be to find a file and the explicit slots may include a file that was shared from the manager of the enterprise user submitting the query 202 and a timeframe of the share being this week. An example additional slot that may be detected based on the user context, may be that the file is a file associated with quantum computing based on the enterprise user's current increased interest in the topic of quantum computing identified from the past queries submitted by the enterprise user this week. The query 202, the intents, and the slots may be provided to the signal processing service 130 and stored in one or more databases 206 for subsequent processing to generate signals for provision to the user context service 128, described below. Additionally, the language understanding service 124 may provide the intents and the slots as language understanding results to a search and ranking subservice 208 of the enterprise search service 112.

The search and ranking subservice 208 may perform a lookup on the index 120 using the intents and the slots to identify one or more entities from the plurality of entities 121 stored in the index 120, that match or are responsive to the intents and the slots as results 210 to the query 202. In some examples, the intents and slots may be transformed to a structured API call to the index 120. When two or more entities 121 are obtained from the index 120, the search and ranking subservice 208 may rank the entities 121. In some examples, the entities 121 may be ranked using the current state of the user context retrieved from the user context service 128 to rank more relevant entities 121 higher within the results 210. Data associated with the results 210, including the identified entities 121 and the ranking thereof, may be provided to the signal processing service 130 and stored in one or more databases 206 for subsequent processing to generate signals for provision to the user context service 128, described below.

Additionally, the results 210 to the query 202 may then be provided to the language generation service 126 to build a response 212. In addition to the results 210, the response 212 may prompt at least one of query refinement or feedback. A type of the prompt included may be based on the results 210. As one example, the response 212 may include or prompt suggested filters or additional constraints for further refining the query 202 (e.g., "I have found three files shared from your manager this week" to prompt a further refinement to narrow down from the three files to one). As another example, the response 212 may include a request for confirmation that the results are what the enterprise user was looking for (e.g., "I have found one file. Is this the file you want?"). Data associated with the response 212, including the prompts to filter by adding constraints and/or to provide feedback, may be provided to the signal processing service 130 and stored in one or more databases 206 for subsequent processing to generate signals for provision to the user context service 128, described below.

The response 212 may be provided over the network 103 to the document management application 118 for presentation to the enterprise user on the client computing device 102. In some examples, the response 212 may be presented as part of the search session dialog. The response 212 may be presented audibly, visually, or a combination of both audibly and visually. Once presented, user interactions 214 with the response 212 may be captured by the document management application 118 at the client computing device 102. Example user interactions 214 may include the enterprise user clicking on or otherwise opening the one or more entities included in the response 212 as part of the results 210, such as a document or a contact. Similarly, the enterprise user's failure to click on or otherwise open an entity in the response 212 may be collected as a user interaction 214. Other example user interactions 214 may include explicit feedback from the enterprise user, such as feedback responsive to a prompt included in the response 212 that includes additional constraints to add to the query 202 (e.g., creating a multi-turn search session) or confirmation of accuracy of the results 210. For a multi-turn search session, additional queries received in subsequent turns may be similarly processed as discussed above. Additionally, search session context may be gleaned from previous turns of the search session. Examples of a multi-turn search session and search session context are described with reference to FIGS. 6 and 7 below.

The user interactions 214 may be provided to an event API 216 of the enterprise search service 112 over the network 103. Similar to the search API 204, the event API 216 may be an interface via which the enterprise search service 112 is communicatively coupled to the other enterprise services 106. The event API 216 may specifically enable transmission of user interactions associated with enterprise search responses captured via applications 114 associated with those other enterprise services 106, such as the document management application 118, to the enterprise search service 112. The event API 216 passes the user interactions 214 to the signal processing service 130 to be stored in one or more databases 206 for subsequent processing to generate signals for provision to the user context service 128, described below.

The signal processing service 130 may process data received from various sources to generate signals for updating user context maintained at the user context service 128. In some examples, the data processing is performed in near-real time to the runtime of the above-described enterprise search query process. In other examples, the data processing is performed asynchronously from runtime of the above-described enterprise search query process, where the data processing may be triggered ad-hoc. The data received at the signal processing service 130 may include the query 202, intents, and slots received from the language understanding service 124, the results 210 to the query 202 received from the search and ranking subservice 208, the response 212 received from the language generation service 126, the user interactions 214 received from the event API, and other user data, including a user profile or a determined current user interest. As described in more detail with reference to FIGS. 4 and 5, the context data may be further processed by the signal processing service 130 to infer intent-based user centric signals for use in future queries to enhance relevancy based on user context.

Figure 3:
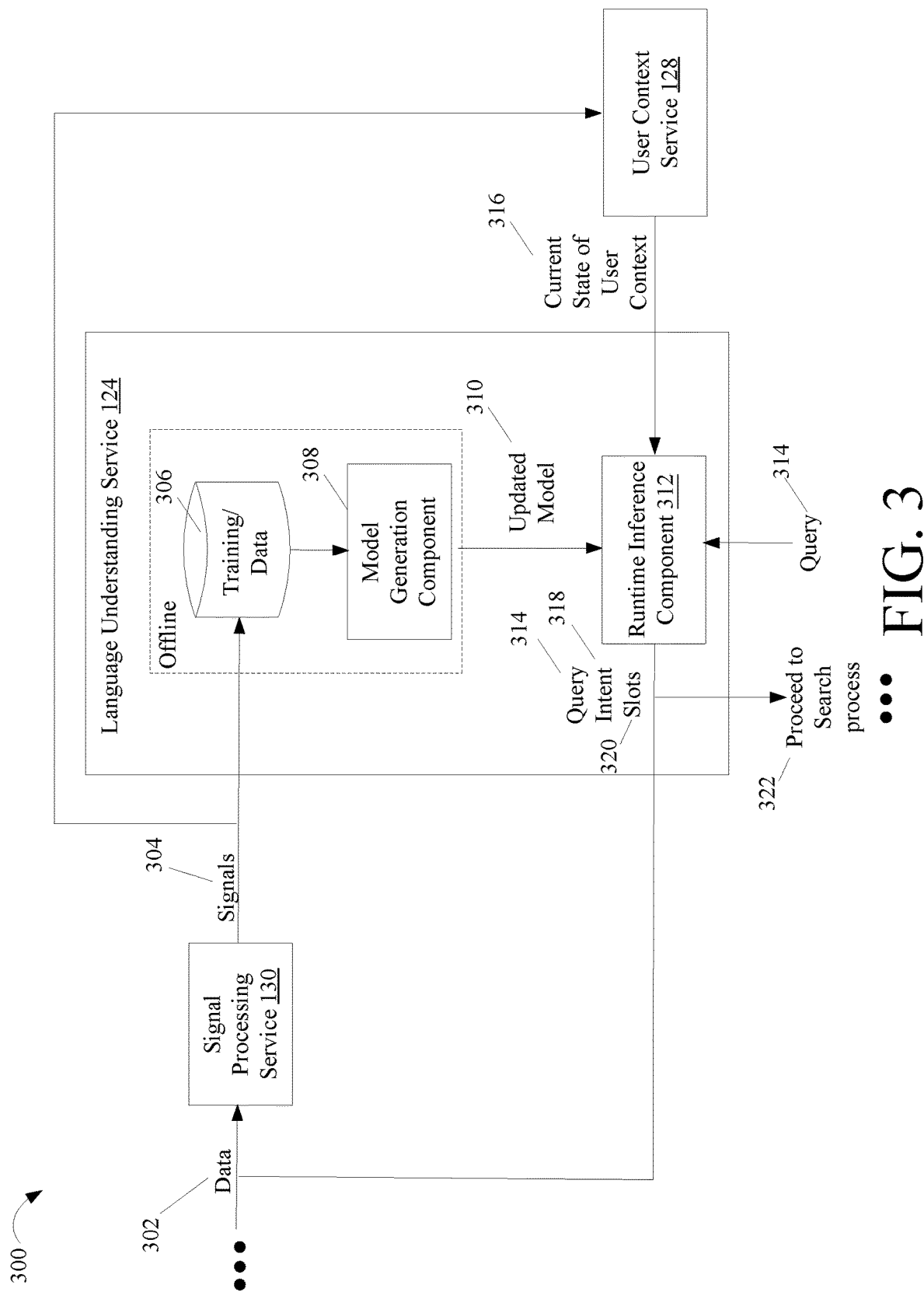
FIG. 3 conceptually illustrates the implementation of user context by the language understanding service of the system of FIG. 1.

FIG. 3 is a conceptual diagram 300 illustrating implementation of user context by the language understanding service 124 of the system 100 of FIG. 1. Data 302, including enterprise search history such as past queries, intents and slots detected from the queries, query results, responses, and user interactions to those responses, among other example data described in more detail with reference to FIG. 4, may be received at the signal processing service 130 and processed to generate signals 304.

The language understanding service 124 may receive and store these signals 304 from the signal processing service 130 to be utilized as training data 306 for generating language understanding models implemented by the language understanding service 124 to account for user context. For example, the model generation component 308 may iteratively generate updated models, such as updated model 310, using the signal-based training data 306. In some examples, the model generation may occur offline, as illustrated, to conserve processing resources and reduce latency experienced by enterprise users when engaging in enterprise search. The updated model 310 may be passed to a runtime inference component 312 of the language understanding service 124 that executes the updated model 310 to process an enterprise search query received, such as query 314.

The user context service 128 may also receive and store the signals 304 processed by the signal processing service 130 to periodically update a user context for the enterprise user, as described in more detail with reference to FIG. 4 below. When the updated model 310 is executing to process the query 314, the language understanding service 124 may retrieve a current state of the user context 316 from the user context service 128 for use in determining an intent 318 and slots 320 of the query 314 as language understanding results. While a single intent (intent 318) for the query 314 is described with reference to FIG. 3, in other examples, a query may include multiple intents.

The language understanding service 124 may evaluate or analysis the query 314 using natural language processing techniques including, for example, a rule-based model or algorithm, a machine learning model or algorithm, or a regular expression to determine the intent 318 and slots 320 of the query 314. An intent may refer to a goal or an intention of the enterprise user's query. For example, if the query 314 is "Find most recent QS document", the intent 318 of the query 314 may be to view a document related to QS that is the most recent of the documents related to QS. Accordingly, the "find document" intent may be determined for the query. A slot may refer to the actionable content associated with the query. In some examples, slots may be determined for the terms expressly included in the enterprise search query. For instance, continuing with the above example where query 314 is "Find most recent QS document", the term "most recent" may be assigned to the slot "time" and the term "QS" may be assigned to either the slot "keyword" or "contact name", where for the latter term, the current state of the user context 316 may be used to determine which is more accurate (i.e., which is in alignment with the enterprise user's intention). For example, if in the recent past, the enterprise user searched for the abbreviation "QS" and it was determined that the abbreviation is a keyword rather than a contact name based on the user's interactions with the response, when the query 314 including "QS" is received from the enterprise user, the intent 318 and slots 320 can be more confidently determined based on the understanding that "QS" is a keyword, and thus and the term "QS" may be assigned to the slot "keyword" rather than "contact name".

Additionally, the current state of user context 316 may enable one or more additional slots 320 that are not explicitly expressed (e.g., are not included as terms) within the query 314 to be determined. For example, if based on queries submitted in the past two weeks, a determination is made that the enterprise user is interested in reinforcement learning, and a query including deep learning as a keyword is now received, reinforcement learning may be added as an additional keyword/slot such that results covering both reinforcement learning and deep learning may be retrieved. As another example, if based on the current state of user context 316, the enterprise user is identified as a beginner (a non-expert) on deep learning, this may be added as a constraint to ensure that results provided are geared toward beginners rather than experts.

The language understanding results may then be provided to the enterprise search service 112 to proceed with the process as shown at operation 322 and as described above with reference to FIG. 2. The language understanding results may also be provided to the signal processing service 130 that is included as part of the data 302 that is subsequently processed.

Figure 4:
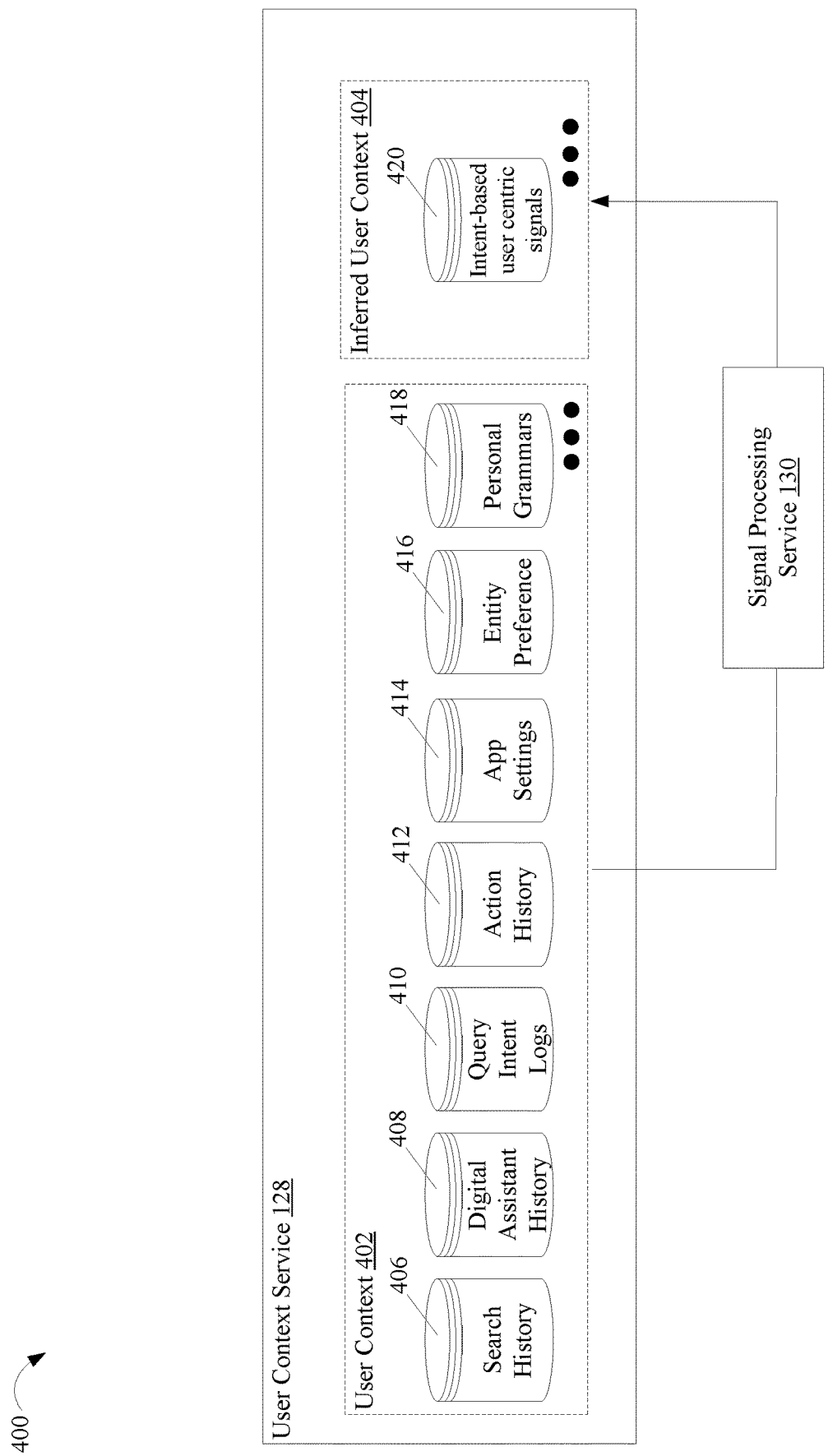
FIG. 4 conceptually illustrates various types of user context maintained by the user context service of the system of FIG. 1.

FIG. 4 conceptually illustrates various types of user context 402, 404 maintained by the user context service 128 of the system of FIG. 1. The user context 402, 404 may be specific to a particular enterprise user. A first example type of user context 402 may include various types of data collected over time in association with the enterprise user. A second example type of user context may be inferred user context 404, where the inferred user context is based on (i.e., inferred from) an aggregation of one or more of the various types of the collected data.

Non-limiting and non-exhaustive examples of the data collected and maintained by the user context service 128 comprising the first example type of user context 402 may include search history 406, digital assistant history 408, query intent logs 410, action history 412, application settings 414, entity preferences 416, and personal grammars 418. The search history 406 may include past queries and user interactions (e.g., clicks, non-clicks, forwards, replies, feedback) with the queries. The digital assistant history 407 may include commands input by the enterprise user to be performed by the digital assistant, responses provide by the digital assistant to the commands, and user interactions with the responses. The query intent logs 410 may include past queries and the respective intents and slots of the past queries determined by the language understanding service 124, as discussed in more detail with reference to FIGS. 2 and 3 above. The action history 412 may include actions performed by the enterprise user across various applications 114 and to different entity types, such as sharing or forwarding of documents, meeting invites, or contacts via the communication application 116 and/or document management application 118. The application settings 414 may include specific permissions or settings of the applications 114. The entity preferences 416 may include the enterprise user's preference for given entities, such as a set of documents that the enterprise user accesses frequently over a given period of time. The personal grammars 418 include a personal contacts list, meetings, and files of the enterprise user.

A non-limiting and non-exhaustive example of the inferred user context 404 may include at least intent-based user centric signals 420 that are generated by aggregating and processing at least portions of the data forming the user context 402. In some examples, the signal processing service 130 processes the data to generate the intent-based user centric signals 420. The intent-based user centric signals 420 may include features. These features may be leveraged by the language understanding service 124, among other user context data, to automatically refine an enterprise search query received. For example, the features may be used to add more constraints than explicitly contained in the query to automatically refine the query. An illustrative example of intent-based user centric signals 420 including keyword features is described with reference to FIG. 5. In some examples, the features may also include an associated weight that may be used in the search and ranking process (e.g., by the search and ranking subservice 208).

Figure 5:
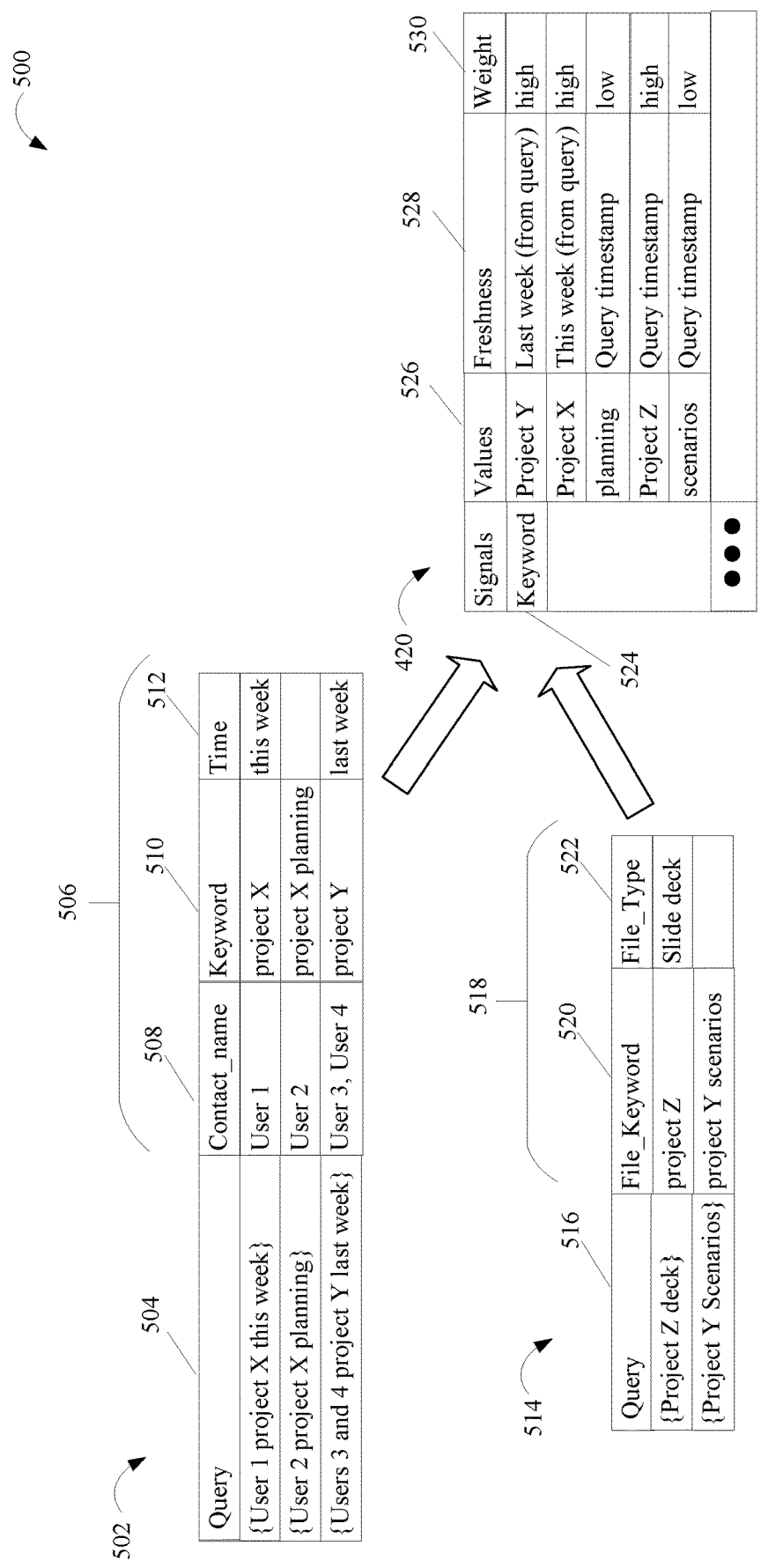
FIG. 5 conceptually illustrates inference of intent-based user centric signals.

FIG. 5 is a conceptual diagram 500 illustrating intent-based user centric signals 420. At least data from query intent logs 410 collected across enterprise services 106, such as the communication service 108 and the document management service 110, over a given time period, such as the past two weeks, may be used to generate the intent-based user centric signals 420. The query intent logs 410 may include the queries and the intents and slots detected from the queries. In some examples, additional user context, such as other data types from the user context 402 and user data, including a user profile, may be used to generate the intent-based user centric signals 420.

For example, a first table 502 illustrates example enterprise search queries 504 input by the enterprise user via the communication service 108 over the past two weeks and slots 506 (including the values or entities defining the slots 506) identified within the queries 504 by the language understanding service 124. As illustrated, example slots 506 may include a contact name 508, a keyword 510, and a time 512, if any, identified within the queries 504.

A second table 514 illustrates example enterprise search queries 516 input by the enterprise user via the document management service 110 over the past two weeks and slots 518 (including the values or entities defining the slots 518) identified within the queries 516 by the language understanding service 124. As illustrated, example slots 518 may include a file keyword 520 and a file type 522, if any, identified within the queries 516.

Using data from the first and second tables 502, 514, the intent-based user centric signals 420 may be generated. In some examples, the intent-based user centric signals 420 include features 524, where the features may correspond to slot types identified within the queries 504, 516. As illustrated, one example feature 524 is a keyword corresponding to the keyword 510 and file keyword 520 slots identified within the queries 504, 516, respectively. Values 526 for the feature 524 include the values (e.g., entities defining the slots) for the corresponding keyword 510 and file keyword 520 slots identified within the queries 504, 516.

In some examples, a freshness 528 associated with each value 526 for the feature 524 may be determined. This freshness 538 may be based on explicit time entities identified within the queries 504, 516, such as time 512 slots identified from at least a portions of the queries 504. Alternatively, freshness may be determined based on query timestamps.

In further examples, a weight 530 may be determined for each of the values 526 of the feature 524. As illustrated, the weight 530 may be expressed using relative terms that indicate an importance or relevance of the respective values 526 of the feature 524, such as high, medium or low. For example, as illustrated, keyword values of Project Y, X, and Z may be of more relevance to the user than the keyword values of planning or scenarios. In other examples, the weight 530 may be expressed using numerical values.

The intent-based user centric signals 420 stored at the user context service 128 may be included as part of the current state of user context 316 that is obtained and leveraged by the language understanding service 124 to understand a newly received enterprise query, such as query 314, including to detect intent 318 and slots 320 of the query 314, as described with reference to FIG. 3. Additionally, the weight 530 associated with the values 526 of the features 524 may be utilized by the enterprise search service 112 to rank entities retrieved from the index 120 as search results. For example, an entity retrieved from the index 120 that corresponds to a value 526 of a feature 524 with a higher weight 530 may be ranked higher than an entity that corresponds to a value 526 of a feature 524 with a lower weight 530. A higher ranked entity may be included over a lower ranked entity within a response generated by the language generation service 126, for example.

FIG. 6 illustrates an example user interface of a client application, such as a user interface 600 of the document management application 118, providing user context-based enterprise search capability with multi-modal interactions. The document management application 118 may provide search functionality via a search bar 602 displayed in the user interface 600. For example, an enterprise user may provide touch or text input to the search bar 602 that includes a query, such as "find the Project X planning document".

Additionally, the document management application 118 may integrate a dialog handling service, such as a digital assistant 117 or other similar service using conversational science approaches with human-machine interfaces, to enable a search session prompted by the enterprise user to be treated as a dialog between the enterprise user and the digital assistant 117. Thus, alternatively or in addition to the search bar 602, the document management application 118 may provide search functionality through a voice interface associated with the digital assistant. For example, the user may provide voice input (e.g., speech) that is captured via the voice interface to initiate the enterprise search, where at least a portion of the voice input includes the query. In some aspects, the speech may be converted to text and provided for display in the search bar 602.

As previously discussed, a search session 606 may be treated as a dialog between the enterprise user and the digital assistant 117. For example, upon receiving a query, a conversation panel 604 may be displayed that includes dialog of a search session 606 between the enterprise user and the digital assistant 117. In some examples, voice input from the enterprise user or voice output from the digital assistant 117 may be converted to text and displayed as part of the dialog. In further examples, only portions of the dialog may be displayed, such as portions of the dialog that display information to prompt or solicit feedback from the enterprise user. The conversation panel 604 may be a graphical element displayed within the user interface 600 as shown. Alternatively the conversation panel 604 may be displayed in a separate window overlaying the user interface 600. In the example illustrated, the search session 606 included in the conversation panel 604 may comprise a plurality of turns 608, 610, 612, 614. Each turn may include at least a query that is input by the enterprise user and a response provided by the digital assistant 117. In some examples, the query may also include a command or task to be performed by the digital assistant 117.

A first turn 608 may be comprised of the enterprise user's first query 616 of "Find the Project X planning document" and the digital assistant's first response 618 to the first query that includes an indication that the requested document was found and a link to a location of the document. The first response 618 may be generated using the flow process described with reference to FIG. 2. For example, the first query 616 may be provided via the search API 204 of the enterprise search service 112 to the language understanding service 124. The language understanding service 124 may detect an intent and slots of the first query 616 by leveraging a current state of user context obtained from the user context service 128. The detected intent and slots may be passed back to the enterprise search service 112, where the search and ranking subservice 208 may obtain entities (e.g., documents in this example) from the index 120 that are responsive to the first query 616 based on the detected intent and slots as results to the first query 616. If more than one entity is responsive, search and ranking subservice 208 may rank the entities based on the user context. One example type of user context applied for ranking may include weights 530 for values 526 of features 524 from the intent-based user centric signals 420 that correspond to the entities being ranked. The results comprised of the ranked entities may then be provided as results to the language generation service 126 for generation of the first response 618.

The response may include at least a portion of the results and language to prompt at least one of query refinement or feedback. For example, in the first response 618 provided by the digital assistant in the first turn 608, the results include the Project X planning document and the link thereto. The first response 618 also includes language "Here is the file I found" to implicitly prompt the enterprise user to provide feedback to indicate whether that file found was the correct file. In some examples, the response may be audibly presented by the digital assistant via the voice interface and/or visually presented on the user interface 600 within the conversation panel 604.

At a second turn 610 of the search session 606, the enterprise user provides a second query 620, "Share it with User 2", that also serves as implicit feedback indicating that the file found and provided in the first response 618 was the correct file intended by the enterprise user. Understanding of the second query 620, executing of the enterprise search based on that understanding (e.g., to obtain contact information for User 2 to perform the task of sending the document to the User 2), and generating of a second response 622 to the second query 620 may be performed using the flow process described with reference to FIG. 2. As part of the understanding, context from one or more previous turns of the search session 606 may be used to understand that "it" means the Project X planning document. As illustrated, an example second response 622 to the second query 620 may indicate that the document has been sent to User 2.

At a third turn 612 of the search session 606, the enterprise user provides a third query 624, "Do I have a meeting with them tomorrow, if not schedule one". Understanding of the third query 624, executing of the enterprise search based on that understanding (e.g., to identify meetings, if any, and if not determining the users' availability to perform the task), and generating of a third response 626 to the third query 624 may be performed using the flow process described with reference to FIG. 2. As part of the understanding, context from one or more previous turns of the search session 606 may be used to understand that "them" means User 2. As illustrated, the third response 626 may be that no meeting was found between the enterprise user and User 2 for tomorrow, however, User 2 is available at a certain time tomorrow.

At a fourth turn 614 of the search session 606, the enterprise user provides a fourth query 628, "Ok schedule the meeting with them". Understanding of the fourth query 628, executing of the enterprise search based on that understanding, and generating of a fourth response 630 to the fourth query 628 may be performed using the flow process described with reference to FIG. 2. As part of the understanding, context from one or more previous turns of the search session 606 may be used to understand that "them" means User 2 and to schedule the meeting means to schedule a meeting for the specific time that User 2 is available as included in the third response 626 of the third turn 612. As illustrated, the fourth response 630 may be an indication that the meeting with User 2 has been scheduled at the specific time that User 2 was available tomorrow.

FIG. 7 illustrates another example user interface of a client application, such as a user interface 700 of the communication application 116, providing user context-based enterprise search capability with multi-modal interactions. The communication application 116 may provide search functionality via a search bar 702 displayed in the user interface 700. For example, an enterprise user may provide touch or text input to the search bar 702 that includes a query, such as "Find an expert on quantum computing".

Additionally, the communication application 116 may integrate a dialog handling service, such as a digital assistant 117 or other similar service using conversational science approaches with human-machine interfaces, to enable a search session prompted by the enterprise user to be treated as a dialog between the enterprise user and the digital assistant 117. Thus, alternatively or in addition to the search bar 702, the communication application 116 may provide search functionality through a voice interface associated with the digital assistant 117. For example, the user may provide voice input (e.g., speech) that is captured via the voice interface to initiate the enterprise search, where at least a portion of the voice input includes the query. In some aspects, the speech may be converted to text and provided for display in the search bar 702.

As previously discussed, a search session 706 may be treated as a dialog between the enterprise user and the digital assistant 117. For example, upon receiving a query, a conversation panel 704 may be displayed that includes dialog of a search session 706 between the enterprise user and the digital assistant 117. In some examples, voice input from the enterprise user or voice output from the digital assistant 117 may be converted to text and displayed as part of the dialog. In further examples, only portions of the dialog may be displayed, such as portions of the dialog that display information to prompt or solicit feedback from the enterprise user. The conversation panel 704 may be a graphical element displayed within the user interface 700 as shown. Alternatively the conversation panel 704 may be displayed in a separate window overlaying the user interface 700. In the example illustrated, the search session 706 included in the conversation panel 704 includes a plurality of turns 708, 710, 712. Each turn may include at least a query that is input by the enterprise user and a response provided by the digital assistant 117. In some examples, the query may also include a command or task to be performed by the digital assistant 117.

For example, a first turn 708 of the search session 706 may be comprised of the enterprise user's first query 714 of "Find and expert on quantum computing" and the digital assistant's first response 716 to the first query that includes an indication that an expert (e.g., another enterprise user, User 2) was found and information about that expert, including a photograph, a name, a title, and contact information. The first response 716 may be generated using the flow process described with reference to FIG. 2. For example, the first query 714 may be provided via the search API 204 of the enterprise search service 112 to the language understanding service 124. The language understanding service 124 may detect an intent and slots of the first query 714 by leveraging user context obtained from the user context service 128. The detected intent and slots may be passed back to the enterprise search service 112, where the search and ranking subservice 208 may obtain entities (e.g., people in this example) from the index 120 that are responsive to the first query 714 based on the detected intent and slots as results to the first query 714. If more than one entity is responsive, search and ranking subservice 208 may rank the entities based on user contexts obtained from the user context service 128. One example user context applied for ranking may include weights 530 for values 526 of features 524 from the intent-based user centric signals 420 that correspond to the entities being ranked. The results comprised of the ranked entities may then be provided as results to the language generation service 126 for generation of the first response 716.

The response may include at least a portion of the results and language to prompt at least one of query refinement or feedback. For example, in the first response 716 provided by the digital assistant 117 in the first turn 708, the results may include a person identified as an expert on quantum computing and information about that person. The first response 716 also includes language "I have found User 2" to implicitly prompt the enterprise user to provide feedback to indicate whether that person found is a person of interest. In some examples, the response may be audibly presented by the digital assistant via the voice interface and/or visually presented on the user interface 600 within the conversation panel 604.

At a second turn 710 of the search session 706, the enterprise user provides a second query 718, "Find and share my quantum computing document to them", that also serves as implicit feedback indicating that the person found and provided in the first response 716 was a person intended by the enterprise user. Understanding of the second query 718, executing of the enterprise search based on that understanding (e.g., to find the quantum computing document for sharing), and generating of a second response 720 to the second query 718 may be performed using the flow process described with reference to FIG. 2. In this example, more than one quantum computing document may be found as part of the search. Therefore, as illustrated, an example second response 720 to the second query 718 may indicate that two documents have been found that the enterprise user authored to prompt the user to further refine the second query 718.

At a third turn 712 of the search session 706, the enterprise user provides a third query 722, "Send the document I edited today". Understanding of the third query 722, executing of the enterprise search based on that understanding (e.g., to identify meeting performed today and obtain User 2's contact information for sending), and generating of a third response 724 to the third query 722 may be performed using the flow process described with reference to FIG. 2. As part of the understanding, context from one or more previous turns of the search session 706 may be used to understand that "them" means User 2 and the "document" referred to by the user is one of the two documents found. As illustrated, the third response 724 may be that the quantum computing document edited by the enterprise user today was sent to User 2.

FIG. 8 illustrates an example method 800 for performing an enterprise search. The method 800 may be provided by one or more components of the system 100 described in FIG. 1. The method 800 begins at operation 802 where, for an enterprise user, a user context for enterprise search is periodically updated. The user context, such as user context 402 described with reference to FIG. 4, may be updated based on at least data from a plurality of past enterprise search queries submitted by the enterprise user. This data may include data from at least search history 406 and query intent logs 410, such as the past queries themselves, intents and slots detected, results determined, responses generated, and user interactions with or feedback related to the results and responses. The user context 402 may also be updated based on other types of data collected, such as digital assistant history 408, application settings 414, entity preferences 416, and personal grammars 418. In some examples, and as described in detail with reference to FIG. 4 from this user context 402, intent-based user centric signals 420 may be inferred and later utilized to enhance aspects of the enterprise search process. In further examples, other user data, such as user profile data can also be used for updating user context.

At operation 804, an enterprise search query input by the enterprise user is received from a client application having search functionality and an integrated digital assistant. In some examples, the input of the enterprise search query may initiate a search session dialog with the digital assistant, such as the search session dialogs illustrated and described with reference to FIGS. 6 and 7.

At operation 806, an intent and one or more slots of the enterprise search query may be determined based in part on a current state of the user context for the enterprise user. The enterprise search query may include one or more explicit constraints as indicated by the slots. In some examples, the current state of the user context may be used to add additional constraints that are not explicitly expressed in the query to improve relevancy of the results that are ultimately provided to the enterprise user. In some examples, more than one intent of the enterprise search query may be determined.

At operation 808, based on the determined intent and slots of the enterprise search query, one or more entities may be retrieved from an enterprise search index as results to the enterprise search query. For example, the entities may correspond to the determined intent and slots.

At operation 810, based on the results, a response to the enterprise search query may be generated. The response may include the results to the enterprise search query. Based on the results, the response may also include a prompt to cause the enterprise user to further refine the enterprise search query and/or provide feedback related to the results. For example, if the determined intent of the query indicates the enterprise user is searching for a single entity, and if the results yield more than one potential entity corresponding to the determined slots, the response may indicate that more than one entity was found to prompt the enterprise user to add another constraint. Adding of such a constraint may further refine the enterprise search query to allow the system to narrow down the number of entities to one. As another example, if the results only yield one potential entity, then the response may include language indicating that the entity was found along with the entity itself (e.g., in a form of a link to document, an email message, a contact, etc.) to implicitly prompt the user to indicate whether that one potential entity is indeed the one intended by the user. In other words, the response may include language that attempts to solicit confirmation or feedback from the enterprise user to gauge their satisfaction with the results provided.

At operation 812, the response may be provided to the client application for output to the enterprise user as part of the search session dialog. Via the search session dialog, the enterprise user may be enabled to interact with the response using multiple input modes, including voice, touch, and text. These interactions may be captured and used, along with the determined intent and slots, the results, and the response, as part of the data for periodically updating the user context as described with reference to operation 802, along with any user interactions or feedback to the response.

FIG. 9 is a block diagram illustrating physical components (e.g., hardware) of a computing device 900 with which aspects of the disclosure may be practiced. For example, the computing device 900 may illustrate components of processing devices or servers of the system 100, including the client computing device 102 and the servers 105 of the datacenter(s) 104 hosting the services. The computing device components described below may be suitable for the computing devices and systems described above. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories.

The system memory 904 may include an operating system 905 and one or more program modules 906 suitable for running software application 920, such as the applications 114 run by the client computing devices 102, as well as the one or more virtual machines and/or one or more components associated with the hosted services that are supported by the systems described herein. The operating system 905, for example, may be suitable for controlling the operation of the computing device 900.

Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, solid-state drives, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., application 920) may perform processes including, but not limited to, the aspects, as described herein. Other program modules that may be used in accordance with aspects of the present disclosure may include virtual machines, hypervisors, and other types of applications such as electronic mail and contacts applications, word processing applications, spreadsheet applications, note taking applications, database applications, slide presentation applications, drawing or computer-aided application programs, etc.

Furthermore, embodiments, or portions of embodiments, of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As previously discussed, the aspects and functionalities described herein may operate over distributed systems such as the system 100 described in FIG. 1, where application functionality, memory, data storage and retrieval and various processing functions may be operated remotely from each other over a distributed computing network, such as the Internet or an intranet. Resultantly, users may utilize associated client computing devices 102 to interact with the hosted services, including the communication service 108 and the document management service 110. User interfaces and information of various types may be displayed via on-board computing device displays or via remote display units associated with such computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In some aspects, systems are described. An example system may include at least one processor and at least one memory coupled to the at least one processor and storing instructions. The instructions, when executed by the at least one processor, may cause the system to periodically update an enterprise user's user context for enterprise search based on at least data associated with a plurality of past enterprise search queries submitted by the enterprise user. Accordingly, when an enterprise search query input by the enterprise user is received from a client application having search functionality and an integrated digital assistant, the input of the enterprise search query may initiate a search session dialog with the digital assistant, and an intent and one or more slots of the enterprise search query may be determined based in part on a current state of the user context for the enterprise user. The intent may indicate the enterprise user's intention for the enterprise search query and the one or more slots may indicate actionable content associated with the enterprise search query. One or more of a plurality of entities stored in an enterprise search index that correspond to the intent and the one or more slots may be retrieved from the enterprise search index as results of the enterprise search query. Based on the results, a response may be generated that includes at least a portion of the results to the enterprise search query and a prompt to cause the enterprise user to at least one of further refine the enterprise search query and provide feedback related to the results. The response may be provided to the client application for output to the enterprise user as part of the search session dialog.

In some examples, the enterprise search query comprises a plurality of terms explicitly expressed in the enterprise search query, and one or more natural language processing techniques may be used to determine the intent and at least one slot of the one or more slots based on an analysis of the plurality of terms explicitly expressed in the enterprise search query. The plurality of terms may be further analyzed based in part on the current state of the user context. One or more additional slots that are not associated with the plurality of terms explicitly expressed in the enterprise search query may also be determined based on the current state of the user context for the enterprise user to further refine the enterprise search query.

In other examples, the data from the plurality of past enterprise search queries includes, for each query, data associated with the query, detected intent and slots, retrieved results, generated responses, and/or user interactions to the responses. One or more interactions of the enterprise user with the response may be received from the client application. The one or more interactions may include at least one of a further refinement of the enterprise search query and feedback related to the results. The user context may be updated based on the one or more interactions. The user context may be periodically updated further based on history associated with the digital assistant, action history, settings of the client application, entity preferences, and/or personal grammars.

In further examples, intent-based user centric signals may be inferred from the current state of the user context. The intent-based user centric signals may include a plurality of features, and each of the plurality of features may include one or more values associated with a weight. The intent and the one or more slots of the enterprise search query may be determined based in part on the intent-based user centric signals. Additionally, when the one or more of the plurality of entities retrieved from the enterprise search index as the results include at least two entities, the at least two entities may be ranked within the results based in part on an associated weight from the intent-based user centric signals.

In yet further examples, the search session dialog includes a multi-turn query, where each turn of the multi-turn query comprises a query that is input by the enterprise user and a response to the query that is output by the digital assistant. For example, the enterprise search query and the response may comprise a first turn of the search session dialog, and subsequent to the providing of the response, an other enterprise search query input by the enterprise user may be received from the client application, as part of a second turn of the search session dialog. An intent and one or more slots of the other enterprise search query may be determined based in part on the current state of the user context for the enterprise user and a search session context gleaned from the first turn of the search session dialog. The enterprise search query may include a command for a task to be performed by the digital assistant. A plurality of input modes may be provided, via the client application, to the enterprise user to enable interaction with the search session dialog, the plurality of input modes including at least voice, touch, and text input modes. The plurality of entities stored in the enterprise search index may include files, electronic communications, contacts, and meetings retrieved from a plurality of enterprise data sources.

In some aspects, computer-implemented methods are described. An example computer-implemented method may include, for an enterprise user, periodically updating a user context for enterprise search based on at least data associated with a plurality of past enterprise search queries submitted by the enterprise user. The method may also include receiving, from a client application having search functionality and an integrated digital assistant, an enterprise search query input by the enterprise user, where the input of the enterprise search query may initiate a search session dialog with the digital assistant, and determining an intent and one or more slots of the enterprise search query based in part on a current state of the user context for the enterprise user. The intent may indicate the enterprise user's intention for the enterprise search query and the one or more slots may indicate actionable content associated with the enterprise search query. The method may further include retrieving, from an enterprise search index comprising a plurality of entities, one or more of the plurality of entities corresponding to the intent and the one or more slots as results of the enterprise search query, generating a response based on the results that includes at least a portion of the results to the enterprise search query and a prompt to cause the enterprise user to at least one of further refine the enterprise search query and provide feedback related to the results, and providing the response to the client application for output to the enterprise user as part of the search session dialog.

In some examples, the enterprise search query includes a plurality of terms explicitly expressed in the enterprise search query, and one or more natural language processing techniques may be used in determining the intent and at least one slot of the one or more slots based on an analysis of the plurality of terms explicitly expressed in the enterprise search query, where the plurality of terms may be further analyzed based in part on the current state of the user context. One or more additional slots that are not associated with the plurality of terms explicitly expressed in the enterprise search query may also be determined based on the current state of the user context for the enterprise user to further refine the enterprise search query.

In other examples, one or more interactions of the enterprise user with the response may be received from the client application. The one or more interactions may include at least one of a further refinement of the enterprise search query and feedback related to the results. The user context may be updated based on data associated with the enterprise search query, the intent and the one or more slots, the results, the response, and/or the one or more interactions. Intent-based user centric signals may be from the current state of the user context. The intent and the one or more slots of the enterprise search query may be determined based in part on the intent-based user centric signals.

In further examples, the search session dialog may include a multi-turn query, where each turn of the multi-turn query may comprise a query that is input by the enterprise user and a response to the query that is output by the digital assistant. For example, the enterprise search query and the response may comprise a first turn of the search session dialog, and subsequent to the providing of the response, another enterprise search query input by the enterprise user as part of a second turn of the search session dialog may be received, from the client application. An intent and one or more slots of the other enterprise search query may be determined based in part on the current state of the user context for the enterprise user and a search session context gleaned from the first turn of the search session dialog.

In further aspects, computer storage media is described. Example computer storage media may store instructions, that when executed by a processor, causes the processor to perform operations. The operations may include, for an enterprise user, periodically updating a user context for enterprise search based on at least data associated with a plurality of past enterprise search queries submitted by the enterprise user. The operations may also include receiving, from a client application having search functionality and an integrated digital assistant, an enterprise search query input by the enterprise user, where the input of the enterprise search query may initiate a search session dialog with the digital assistant, and determining an intent and one or more slots of the enterprise search query based in part on a current state of the user context for the enterprise user. The intent may indicate the enterprise user's intention for the enterprise search query and the one or more slots may indicate actionable content associated with the enterprise search query. The operations may further include retrieving, from an enterprise search index comprising a plurality of entities, one or more of the plurality of entities corresponding to the intent and the one or more slots as results of the enterprise search query, generating a response based on the results that includes at least a portion of the results to the enterprise search query and a prompt to cause the enterprise user to at least one of further refine the enterprise search query and provide feedback related to the results, and providing the response to the client application for output to the enterprise user as part of the search session dialog.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   at least one memory coupled to the at least one processor and storing instructions that, when executed by the at least one processor, cause the system to:
   receive, from a client application having search functionality and an integrated digital assistant of an enterprise, an enterprise search query indicative of a user question asking the integrated digital assistant to retrieve an enterprise file, the enterprise search query initiating or continuing a search session dialog with the integrated digital assistant, the enterprise being a business organization, the enterprise file being accessible only by one or more employees of the business organization based at least in part on a permission setting of the client application;
   for an enterprise user, periodically update a user context based on at least a plurality of past enterprise search queries prior to the enterprise search query;
   determine an intent and one or more slots of the enterprise search query based in part on the past enterprise search queries and the enterprise search query, wherein the intent indicates the enterprise user's intention for the integrated digital assistant to retrieve the enterprise file, and wherein the one or more slots specify a file type identifier of the enterprise file;
   based at least in part on: the intent that indicates the enterprise user's intention for the integrated digital assistant to retrieve the enterprise file, the enterprise file being accessible only by one or more employees of the business organization, and the one or more slots specifying the file type identifier of the enterprise file, retrieve the enterprise file via an enterprise search index that indicates a plurality of enterprise files stored to one or more data sources of the business organization;

based at least in part on the retrieving of the enterprise file via the enterprise search index that indicates the plurality of enterprise files, generate a response to the user question asking the integrated digital assistant to retrieve the enterprise file, wherein the response includes a prompt in natural language asking whether the enterprise file is a correct enterprise file; and provide the response to the client application for output as part of the search session dialog.

2. The system of claim 1, wherein the enterprise search query comprises a plurality of terms explicitly expressed in the enterprise search query, and to determine the intent and the one or more slots of the enterprise search query based in part on the user context for the enterprise user, the system is caused to:

using one or more natural language processing techniques, determine the intent and at least one slot of the one or more slots based on an analysis of the plurality of terms explicitly expressed in the enterprise search query, wherein the plurality of terms are further analyzed based in part on the current state of the user context.

3. The system of claim 2, wherein the system is further caused to:

determine one or more additional slots that are not associated with the plurality of terms explicitly expressed in the enterprise search query based on the user context for the enterprise user to further refine the enterprise search query.

4. The system of claim 1, wherein the data from the plurality of past enterprise search queries includes, for each query, one or more of data associated with the query, detected intent and slots, retrieved results, generated responses, and user interactions to the responses.

5. The system of claim 1, wherein the system is further caused to:

receive, from the client application, one or more interactions of the enterprise user with the response, the one or more interactions including at least one of a further refinement of the enterprise search query and feedback related to the results, wherein the user context is updated based on the one or more interactions.

6. The system of claim 1, wherein the user context is periodically updated further based on at least one of: history associated with the digital assistant, action history, settings of the client application, entity preferences, and personal grammars.

7. The system of claim 1, wherein the system is further caused to:

infer intent-based user centric signals from the current state of the user context.

8. The system of claim 7, wherein the intent-based user centric signals include a plurality of features, and each of the plurality of features includes one or more values associated with a weight.

9. The system of claim 7, wherein the system is further caused to:

determine the intent and the one or more slots of the enterprise search query based in part on the intent-based user centric signals.

10. The system of claim 7, wherein the one or more of the plurality of entities retrieved from the enterprise search index as the results include at least two entities, and the system is further caused to:

rank the at least two entities within the results based in part on an associated weight from the intent-based user centric signals.

11. The system of claim 1, wherein:

the search session dialog includes a multi-turn query, wherein each turn of the multi-turn query comprises a query that is input by the enterprise user and a response to the query that is output by the digital assistant, the enterprise search query and the response comprise a first turn of the search session dialog, and subsequent to the providing of the response, the system is further caused to:

receive, from the client application, another enterprise search query input by the enterprise user as part of a second turn of the search session dialog, wherein an intent and one or more slots of the other enterprise search query are determined based in part on a current state of the user context for the enterprise user and a search session context gleaned from the first turn of the search session dialog.

12. The system of claim 1, wherein the enterprise search query includes a command for a task to be performed by the digital assistant.

13. The system of claim 1, wherein a plurality of input modes are provided, via the client application, to the enterprise user to enable interaction with the search session dialog, the plurality of input modes including at least voice, touch, and text input modes.

14. The system of claim 1, wherein the plurality of entities stored in the enterprise search index include files, electronic communications, contacts, and meetings retrieved from a plurality of enterprise data sources.

15. A computer-implemented method comprising:

for an enterprise user, periodically updating a user context for enterprise search based on at least a plurality of past enterprise search queries, the enterprise being a business organization, the enterprise user being an employee of the enterprise;

receiving, from a client application having search functionality and an integrated digital assistant and as part of a search session dialog, an enterprise search query indicative of a user question asking the integrated digital assistant to retrieve an enterprise file, the enterprise file being accessible only by one or more members of the business organization based at least in part on a permission setting of the client application;

determining an intent and one or more slots of the enterprise search query based in part on the plurality of past enterprise search queries and the enterprise search query, wherein the intent indicates the enterprise user's intention for the integrated digital assistant to retrieve the enterprise file and the one or more slots indicate specify a file type identifier of the enterprise file indicated in the enterprise search query;

based at least in part on: the determining of the intent that indicates the enterprise user's intention for the integrated digital assistant to retrieve the enterprise file, the permission setting, and the one or more slots specifying the file type indicated in the enterprise search query, retrieving, a plurality of files of the business organization;

based at least in part on the retrieving of the plurality of files, generating a response that includes a prompt in natural language asking which file, of the plurality of files the user wants; and providing the response to the client application for output as part of the search session dialog.

16. The computer-implemented method of claim 15, wherein the enterprise search query includes a plurality of terms explicitly expressed in the enterprise search query, and determining the intent and the one or more slots based in part on a current state of the user context for the enterprise user comprises:

using one or more natural language processing techniques, determining the intent and at least one slot of the one or more slots based on an analysis of the plurality of terms explicitly expressed in the enterprise search query, wherein the plurality of terms are further analyzed based in part on the current state of the user context; and determining one or more additional slots that are not associated with the plurality of terms explicitly expressed in the enterprise search query based on the current state of the user context for the enterprise user to further refine the enterprise search query.

17. The system of claim 1, wherein the system is further caused to:

receive, from the client application, one or more interactions of the enterprise user with the response, the one or more interactions including at least one of a further refinement of the enterprise search query and feedback related to the results, wherein the user context is updated based on one or more of data associated with the enterprise search query, the intent and the one or more slots, the results, the response, and the one or more interactions.

18. The computer-implemented method of claim 15, further comprising:

inferring intent-based user centric signals from a current state of the user context; and determining the intent and the one or more slots of the enterprise search query based in part on the intent-based user centric signals.

19. The computer-implemented method of claim 15, wherein:

the search session dialog includes a multi-turn query, wherein each turn of the multi-turn query comprises a query that is input by the enterprise user and a response to the query that is output by the digital assistant, the enterprise search query and the response comprise a first turn of the search session dialog, and subsequent to the providing of the response, the method further comprises:

receiving, from the client application, an other enterprise search query input by the enterprise user as part of a second turn of the search session dialog; and determining an intent and one or more slots of the other enterprise search query based in part on the current state of the user context for the enterprise user and a search session context gleaned from the first turn of the search session dialog.

20. Computer storage media storing instructions, that when executed by a processor, causes the processor to perform operations comprising:

for an enterprise user, periodically updating a user context for enterprise search at least a plurality of past enterprise search queries the enterprise user being an employee of a business organization;

receiving, from a client application having search functionality and an integrated digital assistant, an enterprise search query indicative of a user question asking the integrated digital assistant to retrieve an enterprise file and input by the enterprise user, the input of the enterprise search query initiating or continuing a search session dialog with the digital assistant, the enterprise search query being submitted by the enterprise user subsequent to the plurality of past enterprise search queries, the enterprise file being accessible only by one or more members of the business organization based at least in part on a permission setting of the client application;

determining an intent and one or more slots of the enterprise search query based in part on the plurality of past enterprise search queries, wherein the intent indicates the enterprise user's intention for the integrated digital assistant to retrieve the enterprise file and the one or more slots specify a file type identifier of the enterprise file;

based at least in part on: the determining of the intent, the permission setting, and the one or more slots specifying the file type, retrieving, from an enterprise search index comprising a plurality of files, the enterprise file;

based at least in part on the retrieving the enterprise file from the enterprise search index comprising the plurality of files, generating a response, by the integrated digital assistant, that includes a link to the enterprise file; and providing the response to the client application for output to the enterprise user as part of the search session dialog.

* * * * *